G. B. ISHAM.
Gridiron.
No. 86,923.
Patented Feb. 16, 1869.
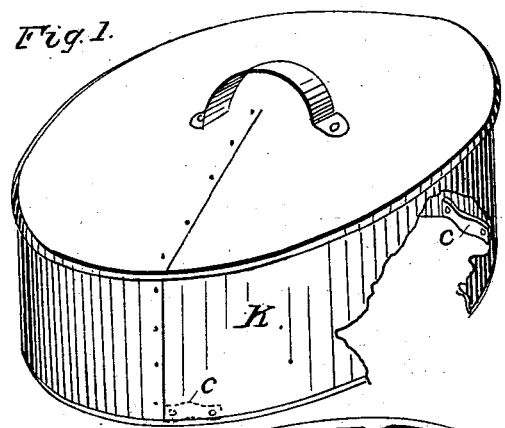
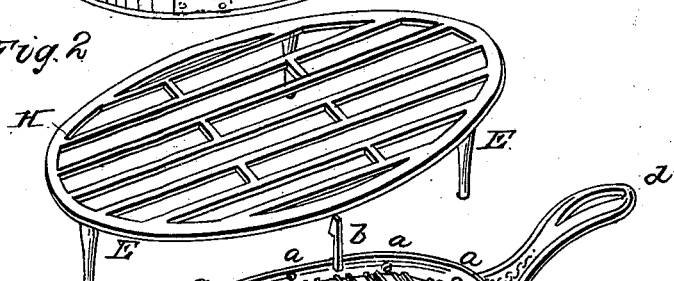
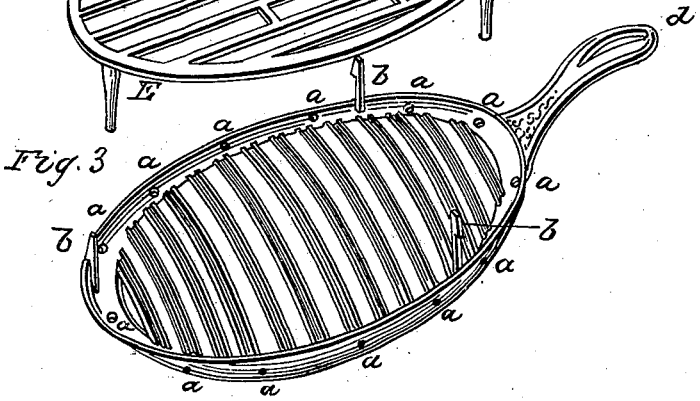

United States Patent Office.

GEORGE B. ISHAM, OF BURLINGTON, VERMONT.

Letters Patent No. 86,923, dated February 16, 1869; antedated January 20, 1869.

IMPROVEMENT IN GRIDIRONS.

The Schedule referred to in these Letters Patent and making part of the same.

*To all whom it may concern:*

Be it known that I, GEORGE B. ISHAM, of the city of Burlington, in the county of Chittenden, and State of Vermont, have invented a new and improved Culinary Apparatus; and I do hereby declare that the following is a full and exact description thereof, reference being had to the accompanying drawings, and the letters of reference marked thereon.

Figure 1, metallic cover, for retaining heat.

Figure 2, perforated elevated disk, for baking pies, cakes, potatoes, and meats, warming plates, &c.

Figure 3, gridiron or broiler, to be used separately, or in connection with either or both of above disk and cover.

The nature of my invention or improvement consists in constructing a culinary apparatus, so as to combine in a light and economical form, and under one cover, a broiler, baker, heater, &c.

I consider the herein-described culinary apparatus as an improvement, in point of weight and economy, over my "combination culinary apparatus," Letters Patent for which were granted to me under date of May 12, 1868.

To enable others skilled in the art to make and use my invention or improvement, I will proceed to describe its construction and operation I construct the reservoir-gridiron, or broiler, fig. 3, of cast or other metal, in the form as shown, the holes $a\ a\ a$ being for the purpose of ventilation, and allowing the heat from surface of stove to pass under the cover, and the arms or lugs $b\ b\ b$ being for the purpose of engaging with the catches $c\ c$, on the inside of the cover, when it is desired to lift the apparatus, independent of the handle $d$.

The perforated disk, fig. 2, I construct of materials, as above, and in the form as shown, the legs or standards E E E being for the purpose of using the disk, fig. 2, separately as a warmer, or in combination with the cover, fig. 1, and broiler, fig. 3, one or both.

The cover, fig. 1, I construct of cast, sheet, or other suitable metal, and in the form as shown. I place inside of same, on lower edge, the catches $c\ c$, for the purpose of engaging with the arms or lugs $b\ b\ b$, on the broiler, fig. 3, so that the apparatus may be lifted thereby.

What I claim as my invention or improvement, and desire to secure by Letters Patent, is—

The improved culinary apparatus, herein described, consisting of the broiler, fig 3, the open-bottomed disk H, and the cover K, all constructed and arranged as described, and for the purposes as set forth.

GEO. B. ISHAM.

Witnesses:
W. L. STRONG,
E. C. RYER.